(12) United States Patent
Kashimoto

(10) Patent No.: US 8,036,359 B2
(45) Date of Patent: Oct. 11, 2011

(54) COMMUNICATION SYSTEM, SERVER APPARATUS, AND DISPLAY CONTROL METHOD

(75) Inventor: Shinichi Kashimoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1139 days.

(21) Appl. No.: 11/819,641

(22) Filed: Jun. 28, 2007

(65) Prior Publication Data

US 2008/0002818 A1   Jan. 3, 2008

(30) Foreign Application Priority Data

Jun. 30, 2006  (JP) ................................ 2006-182674

(51) Int. Cl.
*H04M 3/42*  (2006.01)
(52) U.S. Cl. ............................. 379/202.01; 379/93.21
(58) Field of Classification Search ............. 379/202.01, 379/93.21, 93.14; 370/260, 261
See application file for complete search history.

(56) References Cited

U.S. PATENT DOCUMENTS

| | | | | |
|---|---|---|---|---|
| 5,563,882 A | * | 10/1996 | Bruno et al. ................... | 370/260 |
| 6,466,251 B1 | * | 10/2002 | Troibner et al. ............ | 348/14.08 |
| 7,184,531 B2 | * | 2/2007 | Crouch .................... | 379/202.01 |
| 7,545,758 B2 | * | 6/2009 | Caspi et al. .................... | 370/260 |
| 7,688,751 B2 | * | 3/2010 | Takeda et al. ................. | 370/252 |
| 2007/0223676 A1 | * | 9/2007 | Sasaki et al. ............. | 379/202.01 |
| 2008/0002818 A1 | * | 1/2008 | Kashimoto ............. | 379/202.01 |

FOREIGN PATENT DOCUMENTS

| | | |
|---|---|---|
| JP | 07-264570 | 10/1995 |
| JP | 08-088843 | 4/1996 |
| JP | 2006-031359 | 2/2006 |

* cited by examiner

*Primary Examiner* — Davetta W Goins
*Assistant Examiner* — Phan Le
(74) *Attorney, Agent, or Firm* — Pillsbury Winthrop Shaw Pittman, LLP

(57) ABSTRACT

According to one embodiment, a server apparatus includes a connection controller which selectively executes first processing to execute the communication connections among the several data terminals, respectively, and second processing to make the several data terminals, respectively, to communication-connect to the conference processing unit, a processor which executes a first screen display mode to individually display a plurality of screens, related to each of the several data terminals, and executes a second screen display mode to display screens, in which a plurality of screens related to each of the several data terminals are synthesized by the conference processing unit, based on the prescribed conditions, and a switching controller which selectively executes switching from the first screen display mode to the second screen display mode, or from the second screen display mode to the first screen display mode, and maintaining a screen display mode before switching, based on the prescribed conditions.

28 Claims, 15 Drawing Sheets

| Client | Connection system | Display system |
|---|---|---|
| A | Mesh type in three persons or less | Common window |
| | MCU type in four persons or more | Common window |
| B | Mesh type in three persons or less | |
| | MCU type in four persons or more | Common window |
| C | Mesh type in three persons or less | |
| | MCU type in four persons or more | Common window |
| D | Mesh type in three persons or less | Common window |
| | MCU type in four persons or more | Common window |
| K | Mesh type in three persons or less | Individual window |
| | MCU type in four persons or more | Individual window |
| L | Mesh type in three persons or less | Individual window |
| | MCU type in four persons or more | |
| M | Mesh type in three persons or less | Individual window |
| | MCU type in four persons or more | |
| N | Mesh type in three persons or less | Individual window |
| | MCU type in four persons or more | Individual window |

FIG. 6

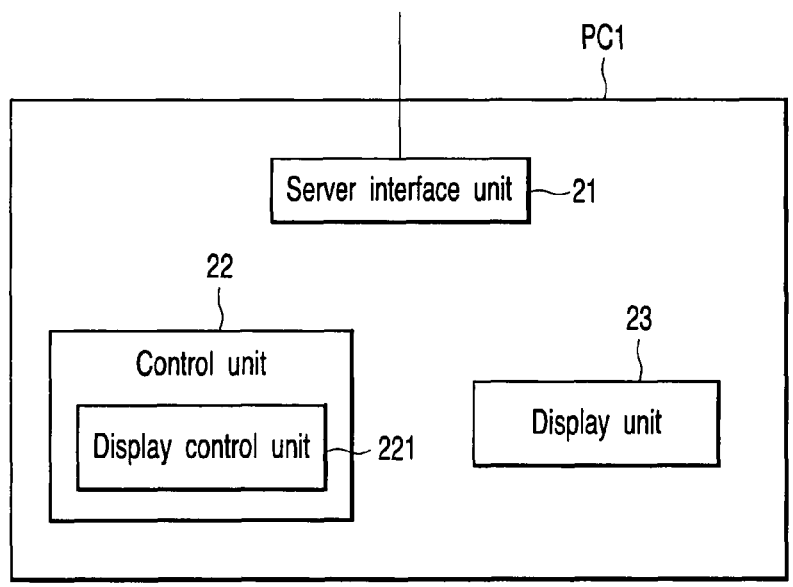

FIG. 7

| Client | Connection system | Display system | Layout |
|---|---|---|---|
| A | Mesh type in three persons or less | Common window | Lateral arrangement |
| | MCU type in four persons or more | Common window | Lateral arrangement |
| B | Mesh type in three persons or less | | Longitudinal arrangement |
| | MCU type in four persons or more | Common window | Longitudinal arrangement |
| C | Mesh type in three persons or less | | |
| | MCU type in four persons or more | Common window | Lateral arrangement |
| D | Mesh type in three persons or less | Common window | Even arrangement |
| | MCU type in four persons or more | Common window | Even arrangement |
| K | Mesh type in three persons or less | Individual window | – |
| | MCU type in four persons or more | Individual window | – |
| L | Mesh type in three persons or less | Individual window | – |
| | MCU type in four persons or more | Individual window | – |
| M | Mesh type in three persons or less | Individual window | – |
| | MCU type in four persons or more | | – |
| N | Mesh type in three persons or less | Individual window | – |
| | MCU type in four persons or more | Individual window | – |

F I G. 1 6

COMMUNICATION SYSTEM, SERVER APPARATUS, AND DISPLAY CONTROL METHOD

CROSS-REFERENCE TO RELATED APPLICATIONS

This application is based upon and claims the benefit of priority from Japanese Patent Application No. 2006-182674, filed Jun. 30, 2006, the entire contents of which are incorporated herein by reference.

BACKGROUND

1. Field

One embodiment of the present invention relates to a communication system, a server apparatus, and a display control method which links data communication connection processing among data terminals, such as personal computers, to call connection processing.

2. Description of the Related Art

A private branch network system is used in an office and a business establishment. The private branch network system accommodates, for example, telephone sets in a telephone exchange apparatus, such as a private branch exchange (PBX) and a key telephone apparatus, as extension terminals, and exchange-connects among the extension terminals and an external communication network, such as a public network, and among the extension terminals with one another by means of the telephone exchange to enable telephone calls.

Recently, a system, which connects a server with data terminals, such as video phone terminals and personal computers, connected thereto to the telephone exchange via a transmission path, and links a voice communication system using the telephone exchange and a data communication system using the server, also has been proposed.

By the way, in the given parallel type system of the telephone exchange and the server, to construct a video conference, etc., the use of a multi-point control unit (MCU) is a possible approach (for instance, JP-A 7-264570 (KOKAI)).

However, the system does not apply the MCU to a visual communication system (VCS) which links data communication connections among the data terminals to call states of the telephone terminals.

In the case of the use of the MCU (hereinafter, referred to as MCU type), configuring a conference with few persons the use frequency of which is high frequently poses to be in short of conference resources of the MCU.

A method of connecting among data terminals by a VCS server itself in a mesh (hereinafter, referred to mesh type) being a possible approach, it is needed to treat a plurality of streams by the data terminals and it results in high load, as the number of speakers increases.

Furthermore, a method of switching between the MCU type and the mesh type in response to the number of speakers is also a possible one; however, the MCU type is a common window display system to synthesize a plurality of screens of conference members by the MCU, and an individual window display system is an individual window display system to individually display each screen of the conference members, so that the users that are the conference members feel something is wrong because the display system are also switched at every time when the MCU type and the mesh type are switched to each other.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary view depicting an example of a storage content of a connection system-display system correspondence table shown in FIG. 2;

FIG. 7 is an exemplary block diagram depicting a functional configuration of the data terminals shown in FIG. 1;

FIG. 16 is an exemplary view depicting an example of a storage content of a connection-display-layout correspondence table shown in FIG. 15;

DETAILED DESCRIPTION

Various embodiments according to the invention will be described hereinafter with reference to the accompanying drawings. In general, according to one embodiment of the invention, a communication system, comprising: a plurality of data terminals which each include display units; a conference processing unit to execute conference synthesis processing among the plurality of data terminals; a server apparatus which receives a call information event including telephone IDs specifying a plurality of telephone terminals by which a conference connection is made, links communication connections in several data terminals associated with the telephone IDs, respectively, to the conference connection, and also enables connecting a conference processing unit; a connection controller which selectively executes first processing to execute the communication connections among the several data terminals, and second processing to make the several data terminals communication-connect to the conference processing unit; a processor which executes a first screen display mode to individually display a plurality of screens related to each of the several data terminals in the first processing on the display units, and executes a second screen display mode to display screens in which a plurality of screens related to each of the several data terminals in the second processing are synthesized by the conference processing unit on the display units, based on the prescribed conditions, for each of the several data terminals; and a switching controller which selectively executes switching from the first screen display mode to the second screen display mode and maintaining a screen display mode before switching, based on the prescribed conditions, in switching from the first processing to the second processing, and selectively executes switching from the second screen display mode to the first screen display mode and maintaining a screen display mode before switching, based on the prescribed conditions, in switching from the second processing to the first processing.

First Embodiment

Figure 1:
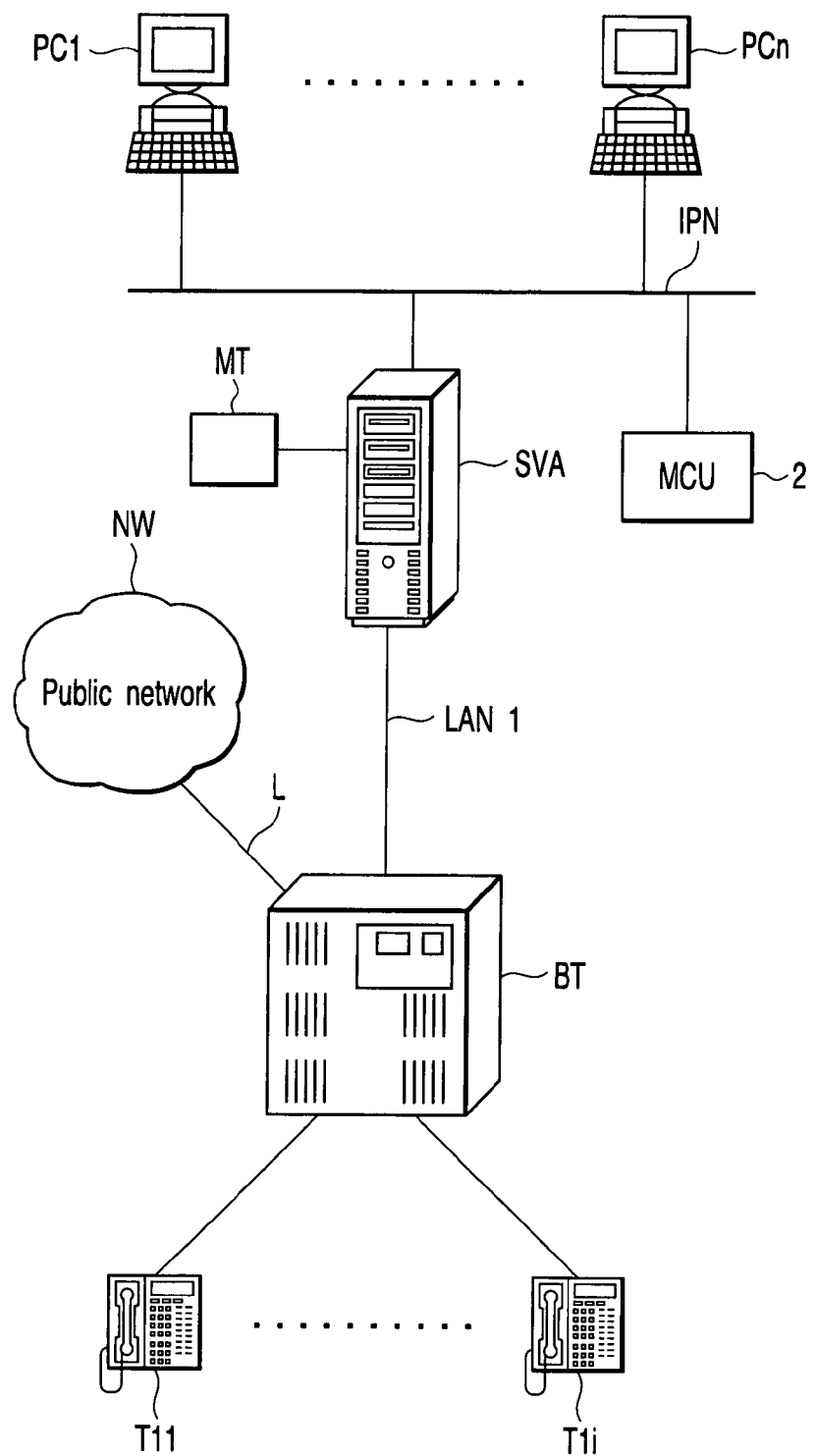
FIG. 1 is an exemplary schematic configuration view depicting a VCS regarding the first embodiment of the present invention.

FIG. 1 is a schematic configuration view illustrating a VCS regarding the first embodiment.

The VCS includes a main apparatus BT and a VCS server SVA and connects between the main apparatus BT and the VCS server SVA through a local area network (LAN) 1.

The main apparatus BT accommodates extension terminals T11-T1$i$ via extensions. The main apparatus BT is connected to a public network NW via a local line L. The main apparatus BT carries out exchange processing among the extension terminals T11-T1$i$ with one another, or among the extension terminals T11-T1$i$ and the public network NW.

The VCS server SVA accommodates a plurality of data terminals PC1-PCn and an MCU 2 as a conference processing unit via an IP network IPN. Each of these data terminals PC1-PCn consists of a general-purpose personal computer and operates by association with each extension terminal T11-T1$i$, respectively. The MCU 2 carries out conference synthesis processing among the data terminals PC1-PCn based on instruction messages and conference control information from the VCS server SVA. That is, video communications (moving communications) are made among the data terminals PC1-PCn.

The VCS server SVA executes an additional function to the main apparatus BT, and treats medium information of, for instance, a video, etc. Moreover, a maintenance terminal MT is connected to the VCS server SVA.

Figure 2:
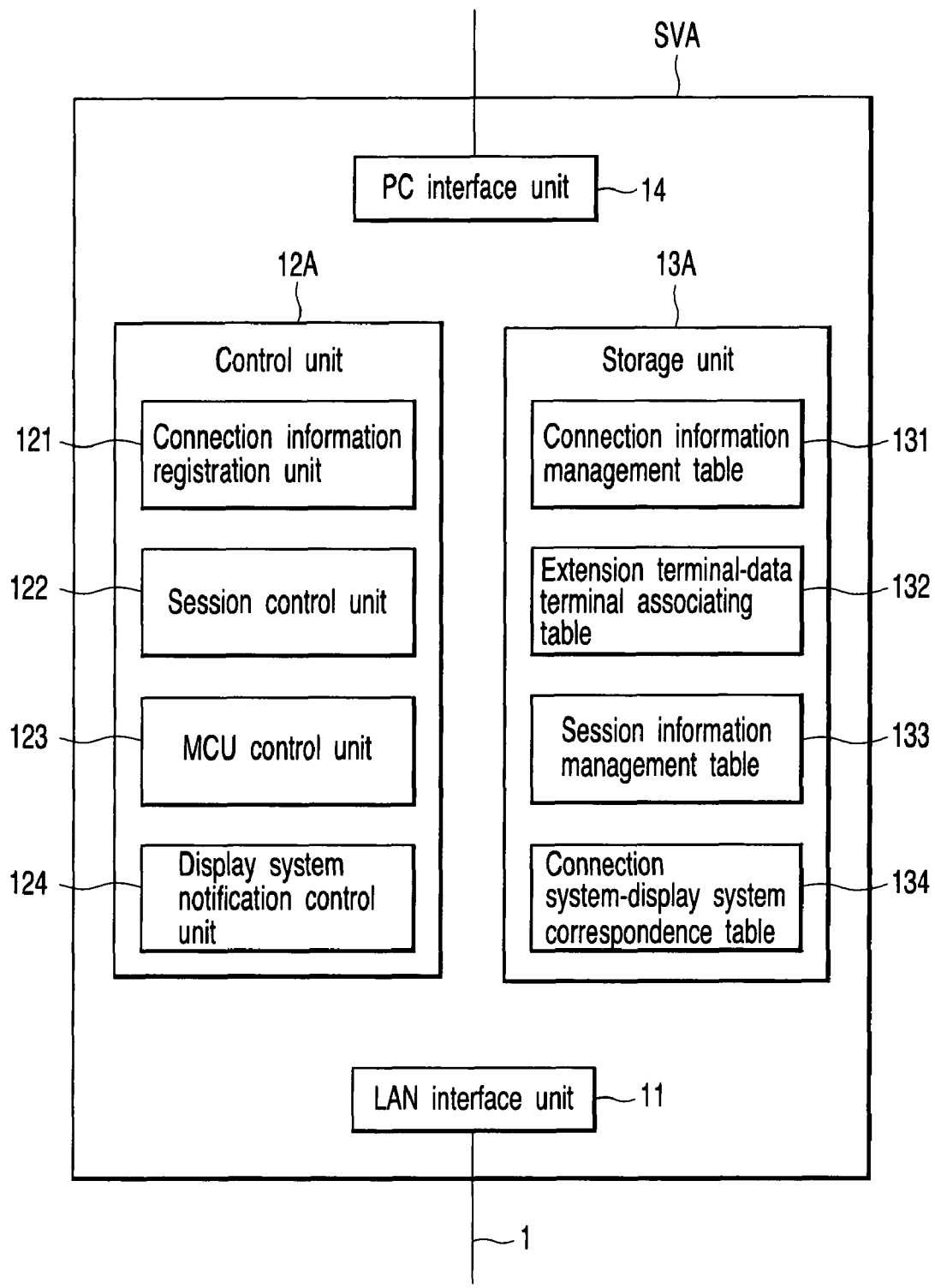
FIG. 2 is an exemplary block diagram depicting a functional configuration of a VCS server shown in FIG. 1.

FIG. 2 is a block diagram illustrating a functional configuration of the VCS server SVA. The VCS server SVA includes a LAN interface unit 11, a control unit 12A, a storage unit 13A, and a PC interface unit 14. Among of them, the LAN interface unit 11 performs interface processing to and from the LAN 1.

The PC interface unit 14 conducts interface processing to and from the data terminals PC1-PCn.

The storage unit 13A stores routing information, etc., which are necessary for connection control performed by the control unit 12A. Further, the storage unit 13A comprises a connection information management table 131 (hereinafter, referred to management table 131); an extension terminal-data terminal associating table 132 (hereinafter, referred to as table 132); a session information management table 133 (hereinafter, referred to as management table 133); and a connection system-display system correspondence table 134 (hereinafter, referred to as table 134).

Figure 3:
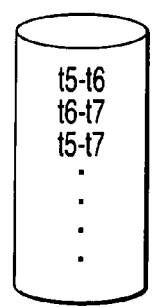
FIG. 3 is an exemplary view depicting an example of a storage content of a connection information management table shown in FIG. 2.

The management table 131 has stored, as shown in FIG. 3, data indicating corresponding relations among telephone numbers (telephone IDs) of each of the extension terminals T11-T1$i$ and status information showing connection statuses. The symbols t1-t9 represent each telephone ID of the extension terminals T11-T1$i$, respectively. Here, to simplify the description, extension terminals T11-T19 are depicted in behalf of the extension terminals T11-T1$i$.

Figure 4:
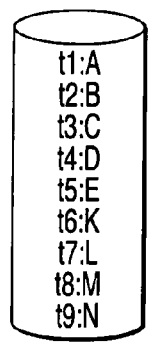
FIG. 4 is an exemplary view depicting an example of a storage content of an extension terminal-data terminal associating table shown in FIG. 2.

The table 132 stores, as shown in FIG. 4, the data indicating the corresponding relations among the extension terminals T11-T1$i$ and the data terminals PC1-PCn. The symbols A-E, and K-N in FIG. 4 indicate user IDs of each data terminal PC1-PC14, respectively.

Figure 5:
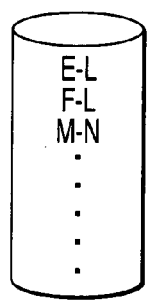
FIG. 5 is an exemplary view depicting an example of a storage content of a session information management table shown in FIG. 2.

As shown in FIG. 5, information indicating session states among the data terminals PC1-PC14 is stored in the management table 133.

The table 134 stores, as depicted in FIG. 6, the data indicating the corresponding relations among the user IDs, connection systems, and display systems. The table 134 is set by means of the maintenance terminal MT to be connected to the VCS server SVA.

On the other hand, the control unit 12A includes a connection information registration unit 121 (hereinafter, referred to as registration unit 121), a session control unit 122, an MCU control unit 123, and a display system notification control unit 124 (hereinafter, notification control unit 124) as new functions to be added to the invention in addition to a control function regarding the status management of the data terminals PC1-PCn and the coordinated operations of the data terminals PC1-PCn and the extension terminals TII-T1$i$.

By analyzing a call information event notified from the main apparatus BT, the registration unit 121 determines that, for example, a telephone call is made between the extension terminal T15 and the extension terminal T16 to add the state information "t5-t6" in the management table 131.

The session control unit 122 reads out the fact that, for instance, the extension terminal T15 is linked to a data terminal PC5 (E), and the extension terminal T16 is linked to a data terminal PC11 (K) from the table 132, based on the updated state information, and retrieves the session states of the data terminals PC5 and PC11 from the management table 133. For instance, in the case of starting a telephone call from now, the data terminals PC5 and PC11 having not started their sessions yet, the session control unit 122 controls so that they start the sessions. After establishing the sessions by the data terminals PC5 and PC11, the session control unit 122 updates the storage content in the management table 133.

On establishing the conference call connections among the extension terminals T11-T1$i$, the MCU control unit 123 referrers to the table 134, and selectively carries out processing to perform communication connections among the data terminals PC1-PC14 to be respectively linked to a plurality of telephone IDs included in the call information event from the main apparatus BT (mesh type processing), and processing to communication-connect among the data terminals PC1-PC9 to be respectively linked to the plurality of telephone IDs included in the call information event to the MCU 2 (MCU type processing) based on the reference result. When carrying out the MCU type processing through the MCU 2, the MCU control unit 123 separately transmits conference control information and session control information as an instruction message to the MCU 2.

The notification control unit 124 notifies individual window display systems which individually display a plurality of screens of each conference member to each of the plurality of data terminals PC1-PCn to be targets in the mesh type processing, respectively, and notifies common window display systems which displays screens synthesized by the MCU 2 to each of the plurality of data terminals PC1-PCn to be targets in the MCU type processing, respectively. When switching from the mesh type processing to the MCU type processing, or from the MCU type processing to the mesh type processing, the notification control unit 124 refers to the table 134, and notifies the instruction information of the fact, that the window display system should be switched from the individual window display system to the common window display system, or from the common window display system to the individual window display system, or of the fact, that the display system before switching should be maintained, to the plurality of data terminals PC1-PCn to be targets, respectively. If the display systems have not been set in the table 134, the notification control unit 124 instructs to the corresponding data terminals PC1-PCn so as to maintain the display system before switching.

FIG. 7 is a block diagram illustrating a functional configuration of each data terminal PC1-PCn. Here, the data terminal PC1 as a representative thereof will be described.

The data terminal PC1 is provided with a server interface unit 21, a control unit 22 and a display unit 23. Among of them, the server interface unit 21 conducts interface processing to and from the VCS server SVA.

The control unit 22 has a display control unit 221 in addition to a control function to achieve an operation as the data terminal PC1. During the conference connection, the display control unit 221 displays each screen of the conference members onto the display unit 23 in the display system instructed from the VCS server SVA.

Next to this, operations of the VCS configured as given above will be mentioned.

Figure 8:
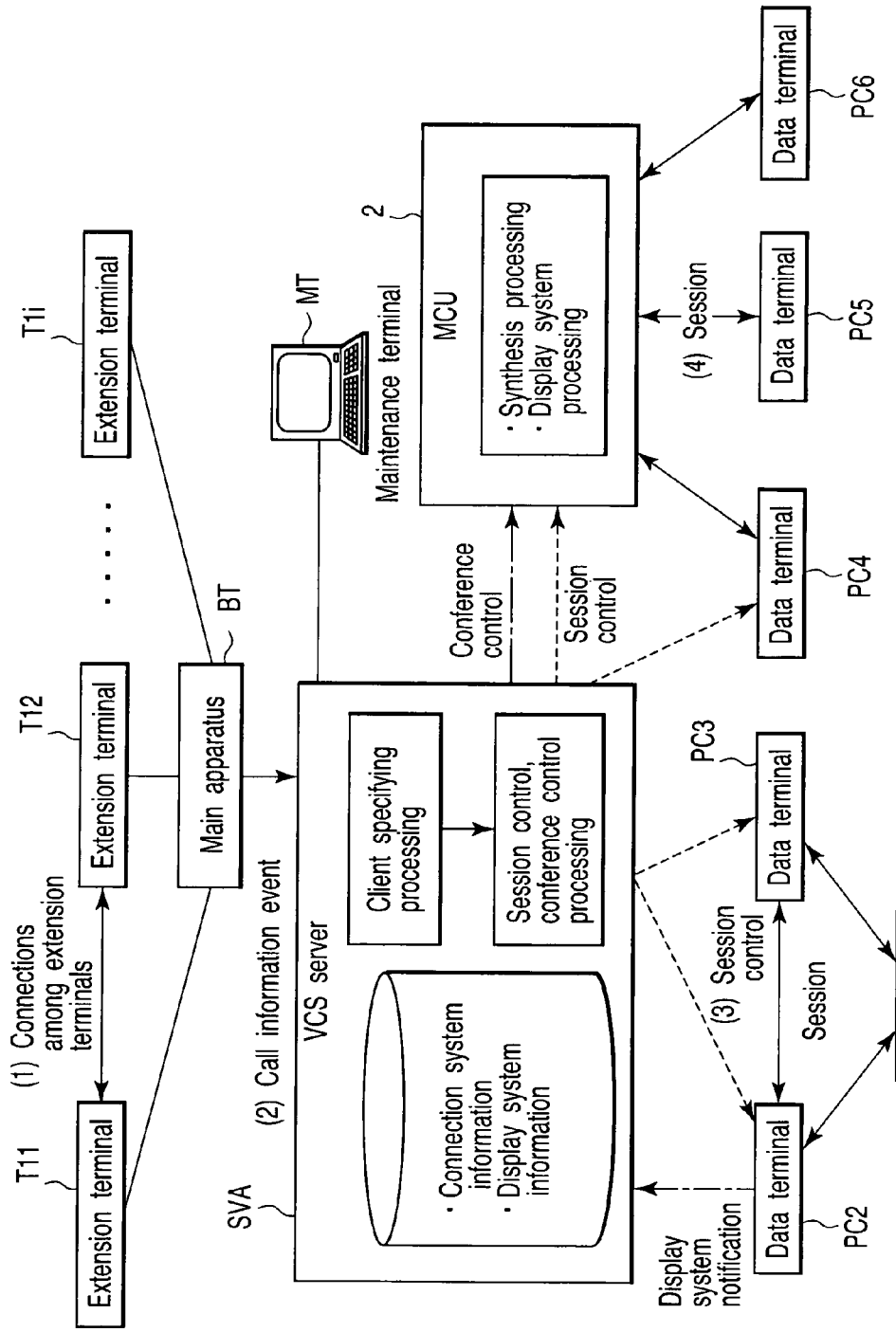
FIG. 8 is an exemplary schematic sequence view depicting transmitting/receiving operations of information among extension terminals, a main apparatus, a VCS server, and data terminals when a conference call connection is established in the first embodiment.

FIG. 8 is a sequence view illustrating operations in the case in which sessions among each data terminal PC1-PC6 are established when they are conference-connected by means of the extension terminals T11-T16.

Now, it is presumed that the extension terminals T11 and T12 make a telephone call with each other (FIG. 8(1)).

In this status, it is assumed that a user in the extension terminal T11 operates to bring the extension terminal T13 into a conference conversation. The extension terminal 11 then transmits the request signal therefor to the main apparatus BT. When receiving the request signal, the main apparatus BT calls out the extension terminal T13 while maintaining a communication link between the extension terminal T11 and the extension terminal T12.

When the user of the extension terminal T13 performs a reply operation to the call, the extension terminal T13 transmits a reply signal to the main apparatus BT.

Thus, the extension terminal T13 can participate in the conference conversations between the extension terminals T11 and T12. At this moment, the main apparatus BT detects the establishment of the conference to transmit the detection result as a call information event to the VCS server SVA (FIG. 8(2)).

When receiving the call information event, the VCS server SVA firstly referrers to the table 131 and the table 132 based on the telephone ID (t3) included in the call information event to specify the data terminal PC3 (C) to be associated with the extension terminal T13 from the reference result, and after this, refers to the table 134 to determine whether the session should be the mesh type or the MCU type. Here, the communication processing being in the mesh type, the VCS server SVA issues an instruction for necessary session control to the data terminals T11, T12 and T13 in the same manner as that of the existing processing (FIG. 8(3)).

Figure 9:
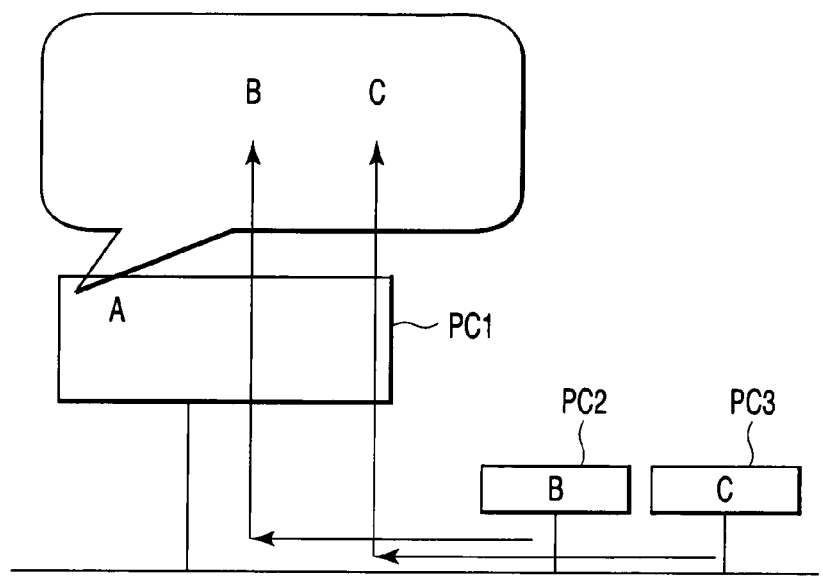
FIG. 9 is an exemplary view depicting a display example of conference members in a mesh type conference connection.

The display unit 23 of the data terminal PC1 results in displaying individual screens B and C of each data terminal PC2 and PC3, as shown in FIG. 9.

On the other hand, when the extension terminal T14 is added to the conference conversion and data terminal PC4 to be linked to the extension terminal T14 is specified, the VCS server SVA instructs conference control, such as instructions of the number of synthesized speakers and the synthesis format, and also instructs session control to the MCU 2 or the data terminals PC1-PC4, then, the VCS server SVA establishes the session among the MCU 2 and the data terminals PC1-PC4 (FIG. 8(4)). In the meantime, the VCS server SVA disconnects the mesh connection among the data terminals PC1-PC3.

Figure 10:
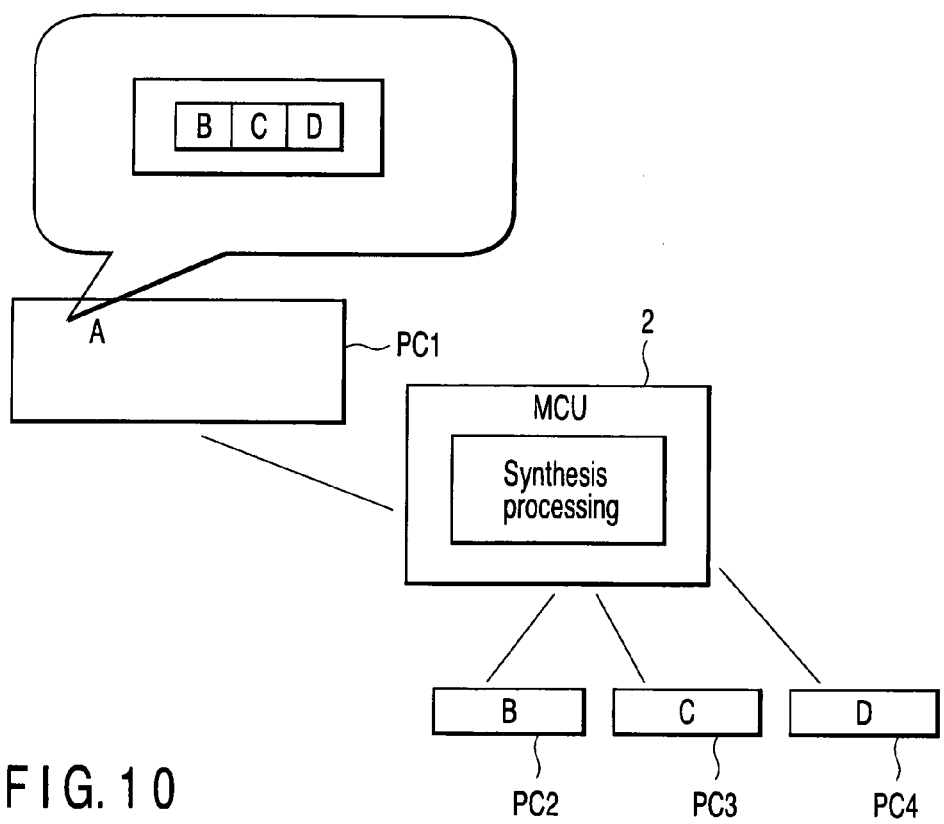
FIG. 10 is an exemplary view depicting a display example of conference members in an MCU type conference connection.

Thereby, the display unit 23 of the data terminal PC1 respectively displays, as shown in FIG. 10, each synthesis screen B, C and D of the data terminals PC2, PC3 and PC4 which are synthesis-processed by the MCU 2.

By the way, switching from the mesh type to the MCU type, or from the MCU type to the mesh type, causes the switching of the display systems of the data terminals PC1-PCn during conference connections, then, this makes the users feel something is wrong.

Figure 11:
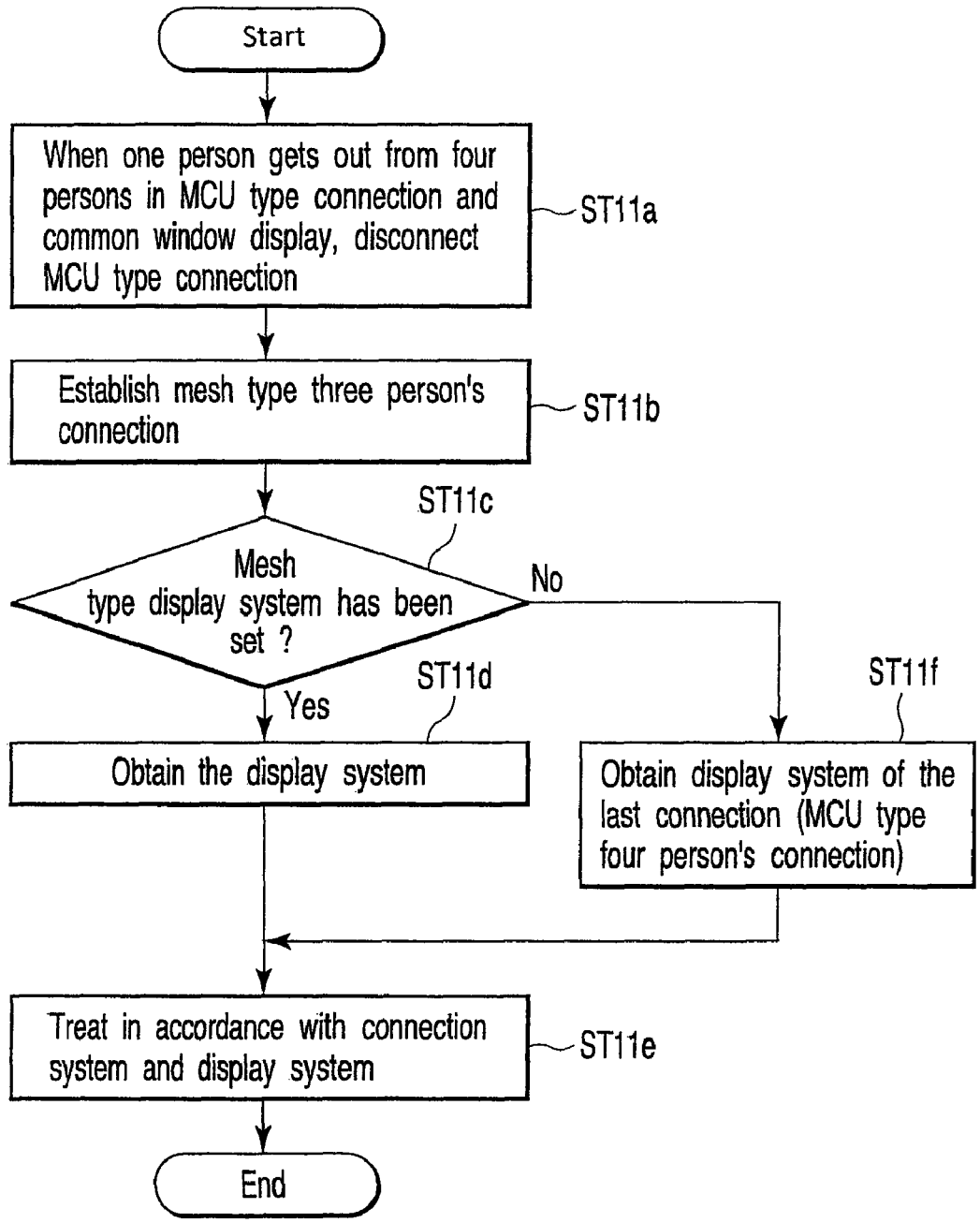
FIG. 11 is an exemplary flowchart depicting a control processing procedure of the data terminals in switching from the MCU type connection to the mesh type connection.

In the first embodiment, therefore, the processing procedure shown in FIG. 11 will be performed by the data terminals PC1-PCn in switching from the MCU type to the mesh type.

Now, it is supposed that the session has been established in the MCU type among the data terminals PC1-PC4. In this status, for example, if the data terminal PC3 gets away, the VCS server SVA transmits an MCU type disconnecting instruction to the remaining data terminals PC1, PC2 and PC4 (block ST11*a*).

In succession, when a session instruction in the mesh type reaches from the VCS server SVA, the remaining data terminals PC1, PC2 and PC4 shift from a block ST11*b* to a block ST11*c*, and there, determines whether or not the display system at the time of switching to the mesh type has been set in the VCS server SVA.

Figure 12:
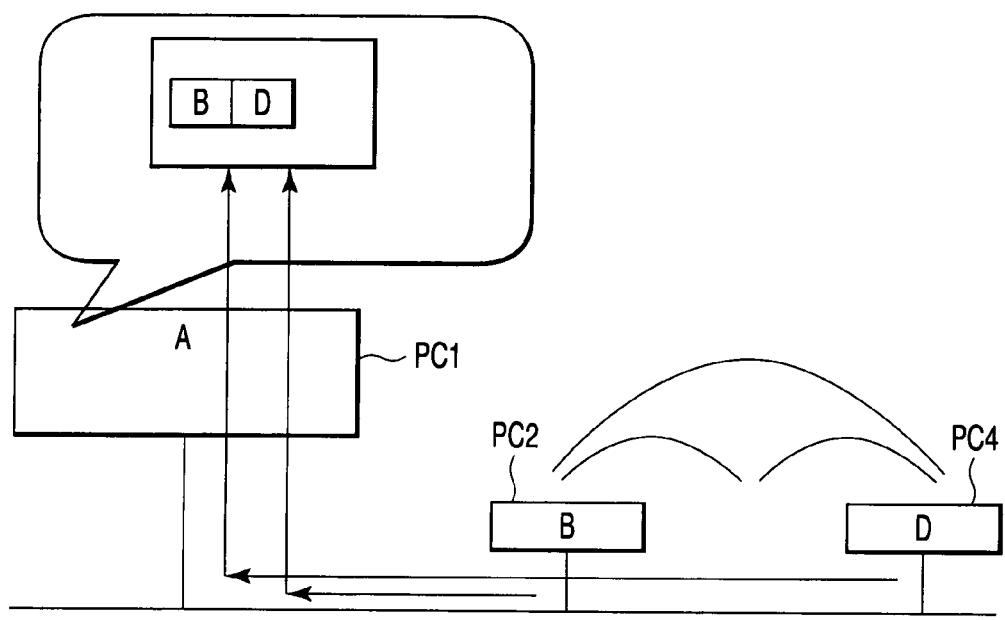
FIG. 12 is an exemplary view depicting an example of a common window display displayed on the data terminals in the first embodiment.

Here, "common window" being set in the data terminal PC1, it obtains the "common window" from the VCS server SVA (block ST11*d*), and displays the screens related to each data terminal PC2 and PC4 on the display unit 123 in a common window display system as shown in FIG. 12 (block ST11*e*).

On the other hand, since the display system for the data terminal PC3 is not set in the VCS server SVA, the data terminal PC3 obtains the just previous display system "common window" from the VCS server SVA (block ST11*f*) to sift to the processing in the block ST11*e*.

Figure 13:
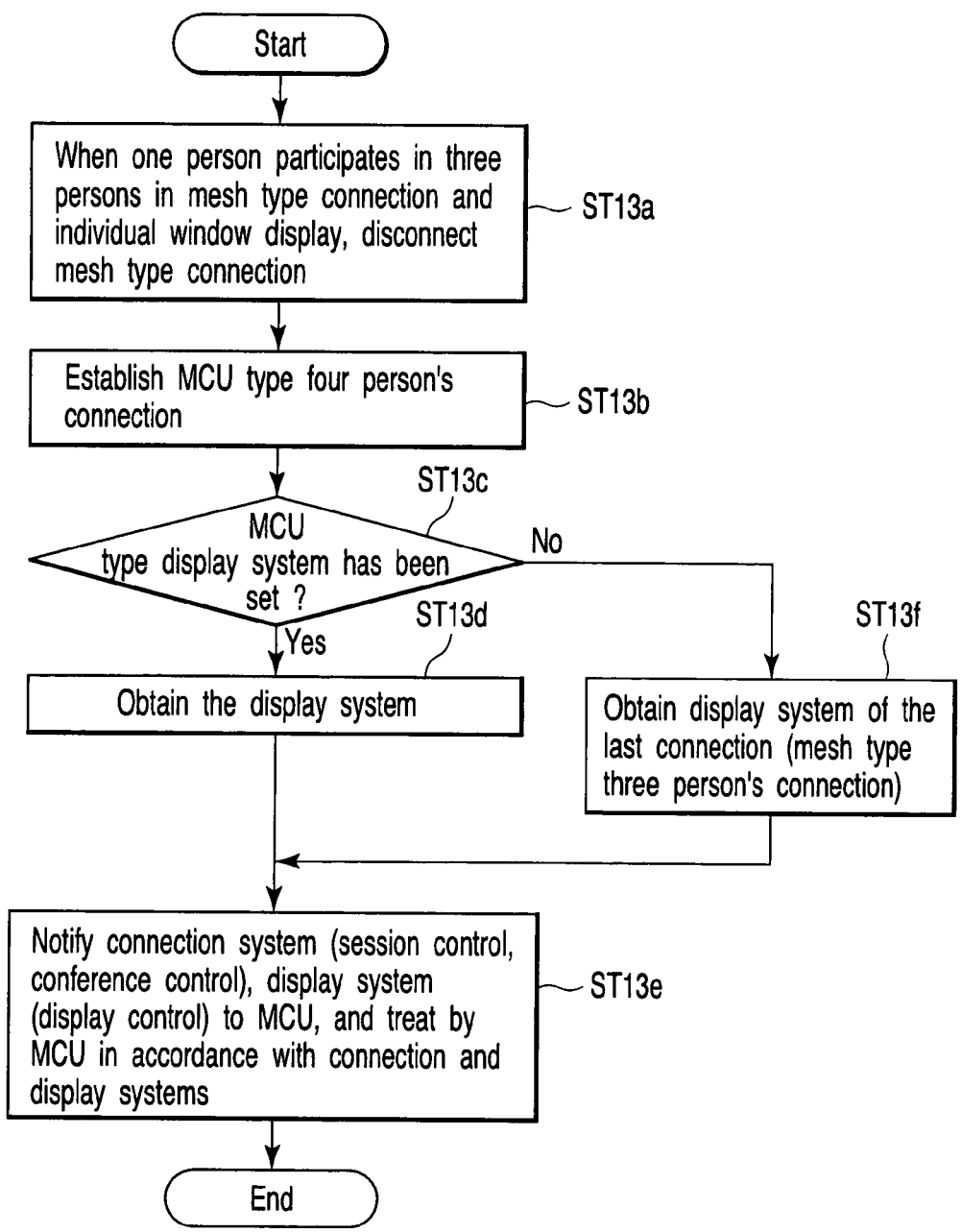
FIG. 13 is an exemplary flowchart depicting a control processing procedure of the VCS server at changing from the mesh type to the MCU type in the first embodiment.

In switching from the mesh type to the MCU type, the VCS server SVA carries out the processing procedure shown in FIG. 13.

It is presumed that the mesh type session has established among the data terminals PC5-PC7. In this status, for instance, if the data terminal PC8 participates in the session, the VCS server SVA transmits a mesh type disconnecting instruction to the data terminals PC5-PC7 (block ST13a).

In succession, the VCS server SVA instructs conference control of the instructions, such as the number of the synthesized speakers and the synthesis format, and also instructs the session control to the MCU 2 or the data terminals PC5-PC8, then, establishes the session among the MCU 2 and the data terminals PC5-PC8 (block ST13b).

After this, the VCS server SVA determines whether or not the display systems in switching to the MCU type are set in the table 134 for each data terminal PC5-PC8, respectively (block ST13c).

Here, "individual window" having been set to the data terminal PC5, it notifies the message of the fact that it obtains the "individual window" from the table 134 (block ST13d), and of the fact that it maintains the "individual window" to the MCU 2 (block ST13e).

Figure 14:
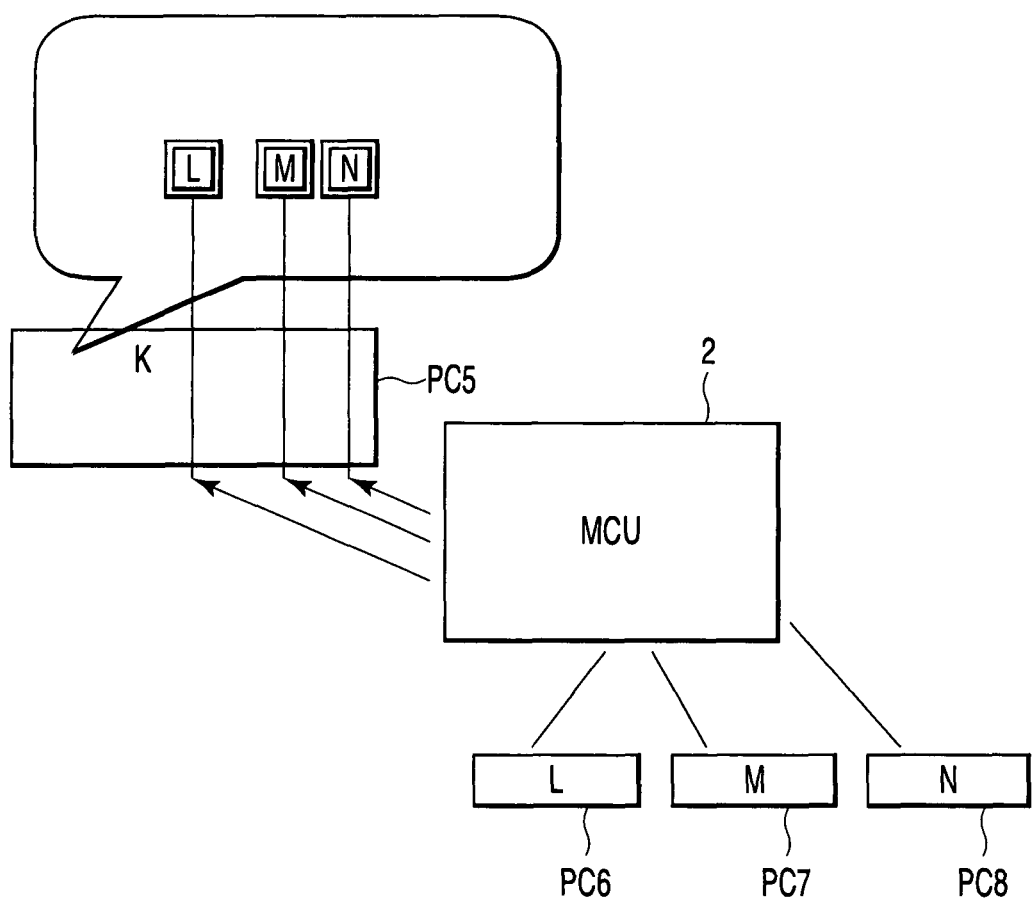
FIG. 14 is an exemplary view depicting an example of individual window display to be displayed on the data terminals in the first embodiment.

Thus, the display unit 23 of the data terminal PC5 displays, as depicted in FIG. 14, the screen related to each of the data terminals PC6, PC7 and PC8 in the individual window display system.

In the meantime, in the data terminal PC6, the display system not having been set in the table 134, the data terminal PC6 obtains the just previous display system "individual window" from the table 134 (block ST13f) then sifts to the processing in the block ST13e.

As mentioned above, in the first embodiment, for each data terminal PC1-PCn, setting the display systems in switching from the mesh type to the MCU type, and in switching from the MCU type to the mesh type in the table 134 of the VCS server SVA enables maintaining the display systems before switching even when the display systems are switched from the mesh type to the MCU type and from the MCU type to the mesh type, and the VCS may avoid bringing discomfort to the users of each data terminal PC1-PCn.

The users themselves of each data terminal PC1-PCn can also determine whether they should maintain their display systems or not, so that the VCS can also maintain the display systems before switching only when this is required.

In the first embodiment, setting to maintain the individual window display system in the table 134 of the VCS server SVA does not need to transmit the synthesized screen generated from the MCU2 to the corresponding data terminals PC5-PC8 even when the display systems are switched from the mesh type to the MCU type, thereby, the VCS may reduce the processing load on the MCU 2 by that.

In the first embodiment, setting to maintain the common window display system in the table 134 of the VCS server SVA poses no need to transmit individual screens for each of the data terminals PC1-PC4 from the VCS server SVA to the corresponding data terminals PC1-PC4 then the VCS can reduce the processing load on the VCS server SVA by that.

Furthermore, in the first embodiment, since the VCS can display each screen of the conference members onto the display units 23 of each data terminal PC1-PCn in the just previous display systems in switching from the mesh type to the MCU type even when the display systems are not set in the table 134 of the VCS server SVA, the VCS may avoid bringing discomfort to the users of each data terminal PC1-PCn also in view of this.

Second Embodiment

Figure 15:
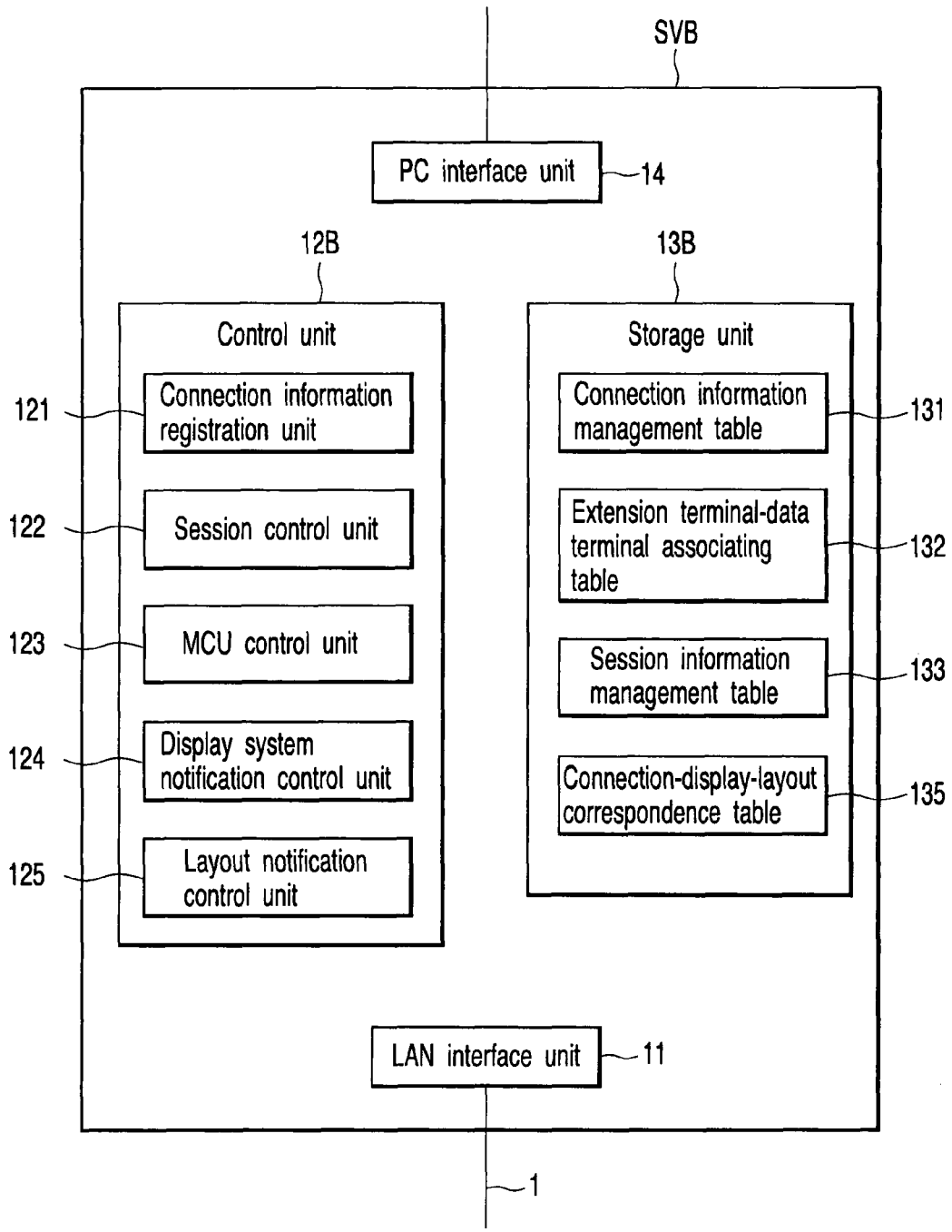
FIG. 15 is an exemplary block diagram depicting a functional configuration of a VCS server as the second embodiment of the invention.

FIG. 15 is a block diagram depicting a functional configuration of a VCS server SVB as the second embodiment of the present invention.

In the VCS server SVB, the storage unit 13B is equipped with a connection-display-layout correspondence table 135 (hereinafter, referred to as table 135). The table 135 stores, as shown in FIG. 16, data indicating the correspondence relations among user IDs, Connection systems, display systems and layouts. The layouts may be arbitrarily selected for each user that the synthesized screens displayed on each display unit 23 of the data terminals PC1-PCn are laterally arranged, longitudinally arranged, or evenly arranged. The table 135 is set by means of a maintenance terminal MT to be connected to the VCS server SVB.

Meanwhile, A control unit 12B further includes a layout notification control unit 125 (hereinafter, referred to as notification control unit 125). When the VCS is switched from the mesh type processing to the MCU type processing, or from the MCU type processing to the mesh type processing, the notification control unit 125 referrers to the table 135 to notify the instruction information of the fact that the layout of the data terminals PC1-PCn should be maintained in the lateral arrangement, longitudinal arrangement, or even arrangement, based on the reference result to each of the plurality of data terminals PC1-Pcn to be the targets. If the layouts have not been set in the table 135, the notification control unit 125 instructs to maintain the layouts before switching to the corresponding data terminals PC1-PCn.

We will account for operations of the VCS configured as given above in the following description.

Figure 17:
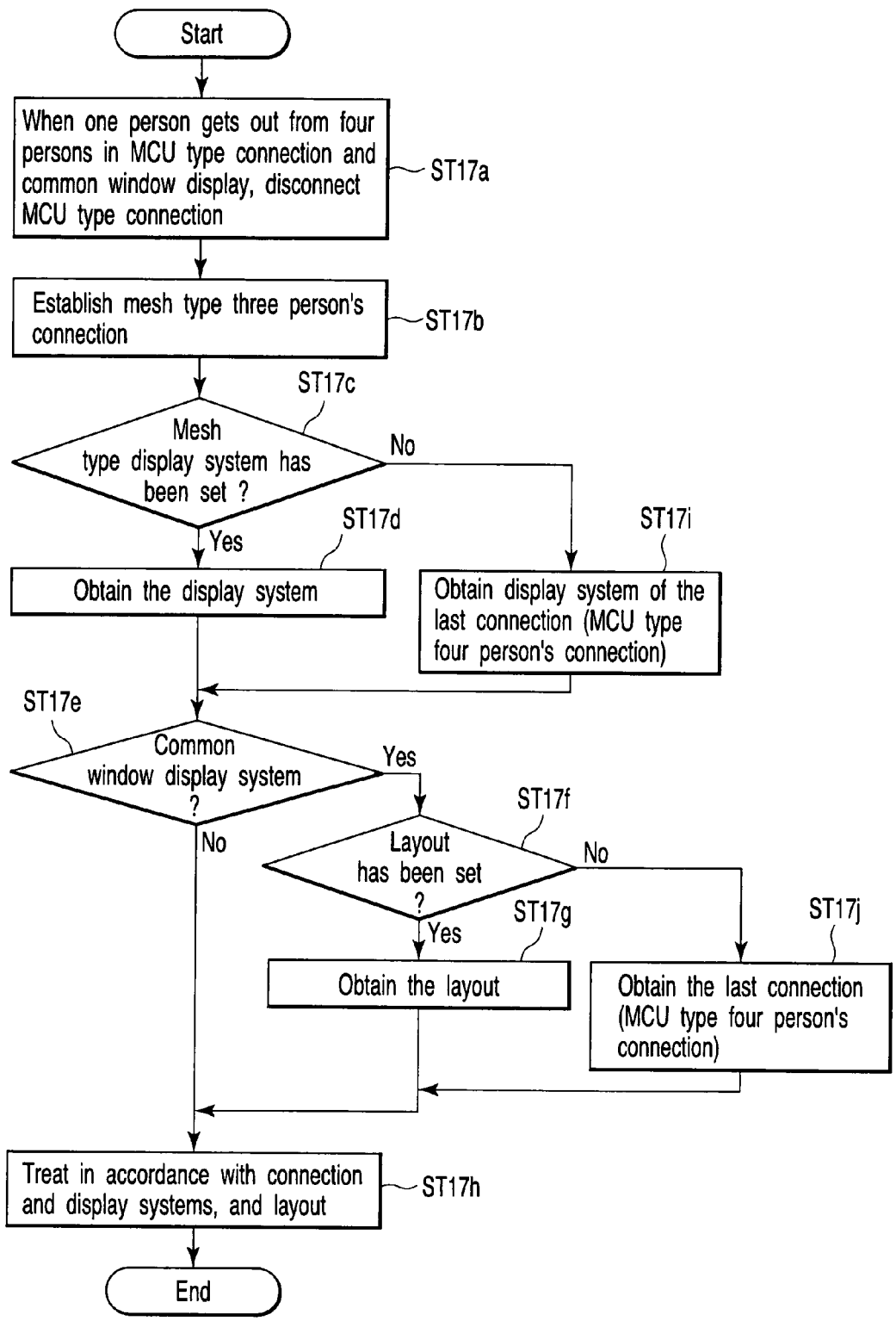
FIG. 17 is an exemplary flowchart depicting a control processing procedure of a data terminal in switching from the MCU type to the mesh type in the second embodiment.

FIG. 17 is a flowchart depicting the control processing procedure of the data terminals PC1-PCn in switching from the MCU type to the mesh type.

Figure 18:
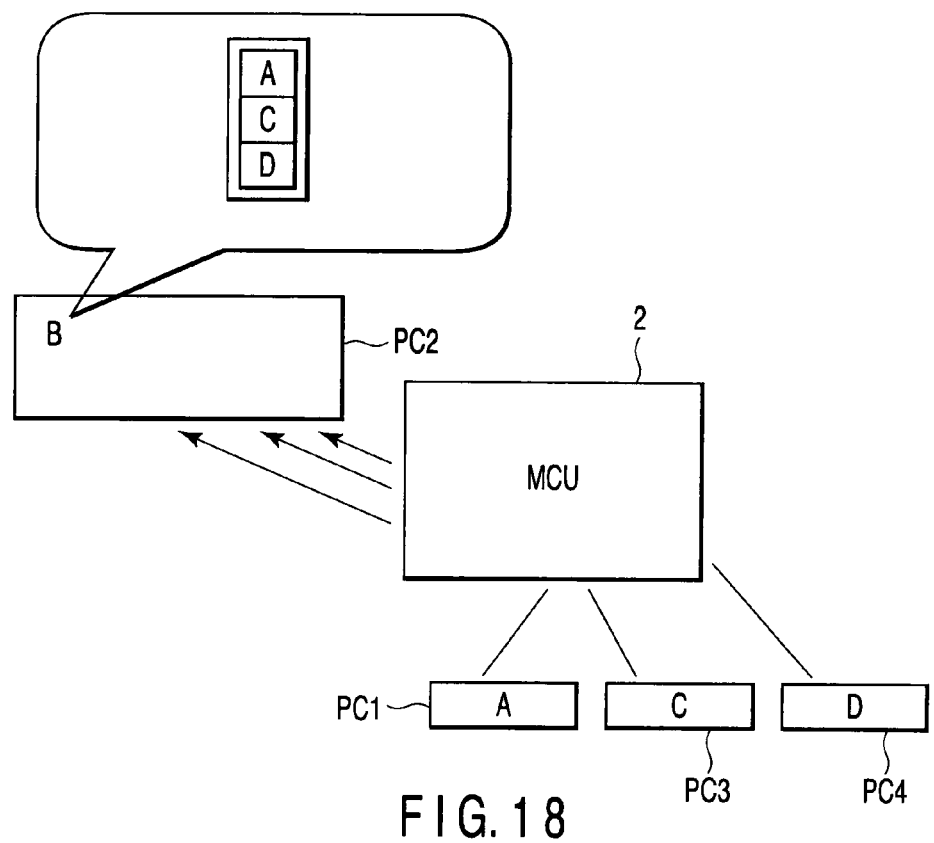
FIG. 18 is an exemplary view depicting an example of a longitudinally arranged layout pattern in a MCU type conference connection in the second embodiment.

Now, it is assumed that the session has established in the MCU type among the data terminals PC1-PC4. At this moment, the display unit 23 of the data terminal PC2 displays, as depicted in FIG. 18, each synthesized screen of the data terminals PC1, PC3 and PC4 in the longitudinally arranged layout.

In such a situation, for instance, if the data terminal PC4 gets away, the VCS server SVB transmits the MCU type disconnection instructions to the remaining data terminals PC1, PC2 and PC3 (block ST17a).

In succession, when reaching the session instruction in the mesh type from the VCS server SVB, the remaining data terminals PC1, PC2 and PC3 make sifts from a block ST17b to a block 17c, and here, determines whether or not the display system in switching to the mesh type is set to the VCS server SVB.

Here, the "common window" being set in the data terminal PC1, it acquires the "common window" from the VCS server SVB (block ST17d).

Next, the data terminal PC1 determines whether or not the acquired display system is the "common window" (block ST17e). Here, the display system being the "common window", the data terminal PC1 inquires whether or not the layout has been set in the VCS server SVB (block ST17f). Here, the layout having been set in the "lateral arrangement", the data terminal PC1 obtains the "lateral arrangement" from the VCS server SVB (block ST17g), and displays the screens related to each data terminal PC2 and PC3 onto the display units 23 in accordance with the "lateral arrangement" (block ST17h).

Figure 19:
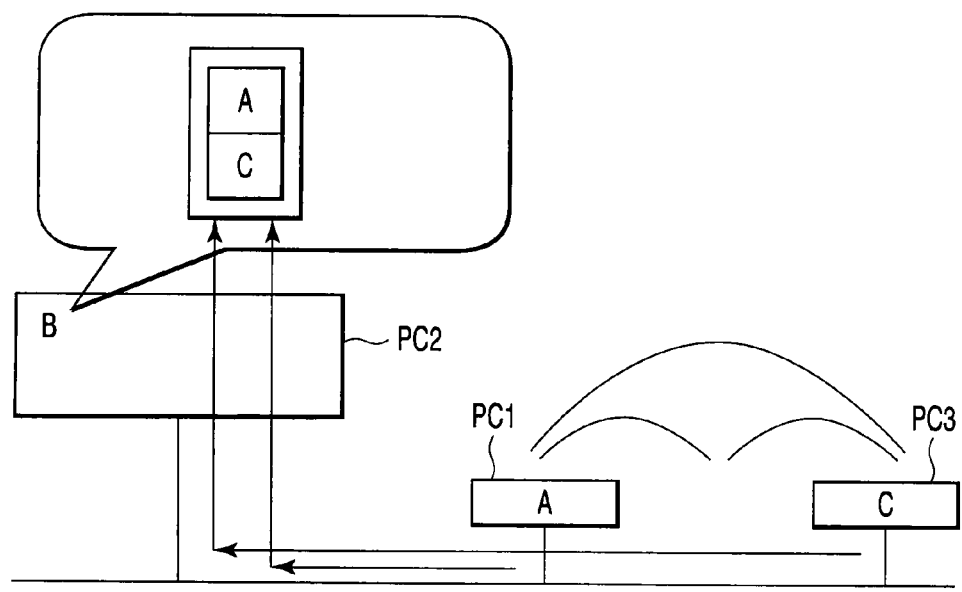
FIG. 19 is an exemplary view depicting an example of a longitudinally arranged layout pattern in a mesh type conference connection in the second embodiment.

In the meantime, the display system not having been set in the VCS server SVB, the data terminal PC2 obtains the just previous display system "common window" from the VCS server SVB (block ST17i) then the data terminal PC2 sifts to the processing in the block ST17e. After this, passing through the processing from the block ST17f to the block ST17h the data terminal PC2 displays, as shown in FIG. 19, the screens concerned with each data terminal PC1 and PC3 onto the display units 23 in accordance with the "longitudinal arrangement". Thereby, even when the display system is switched from the MCU type to the mesh type, the VCS may maintain the layout before switching.

Since the layout in the mesh type has not been set to the VCS server SVB, the data terminal PC3 obtains the just previous layout "lateral arrangement" from the VCS server SVB (block ST17j), the processing procedure sifts to the processing in the block ST17h.

In the block ST17e, if the display system is not set to the "common window", the data terminals PC1-PCn make shift as they are to the block ST17h.

Figure 20:
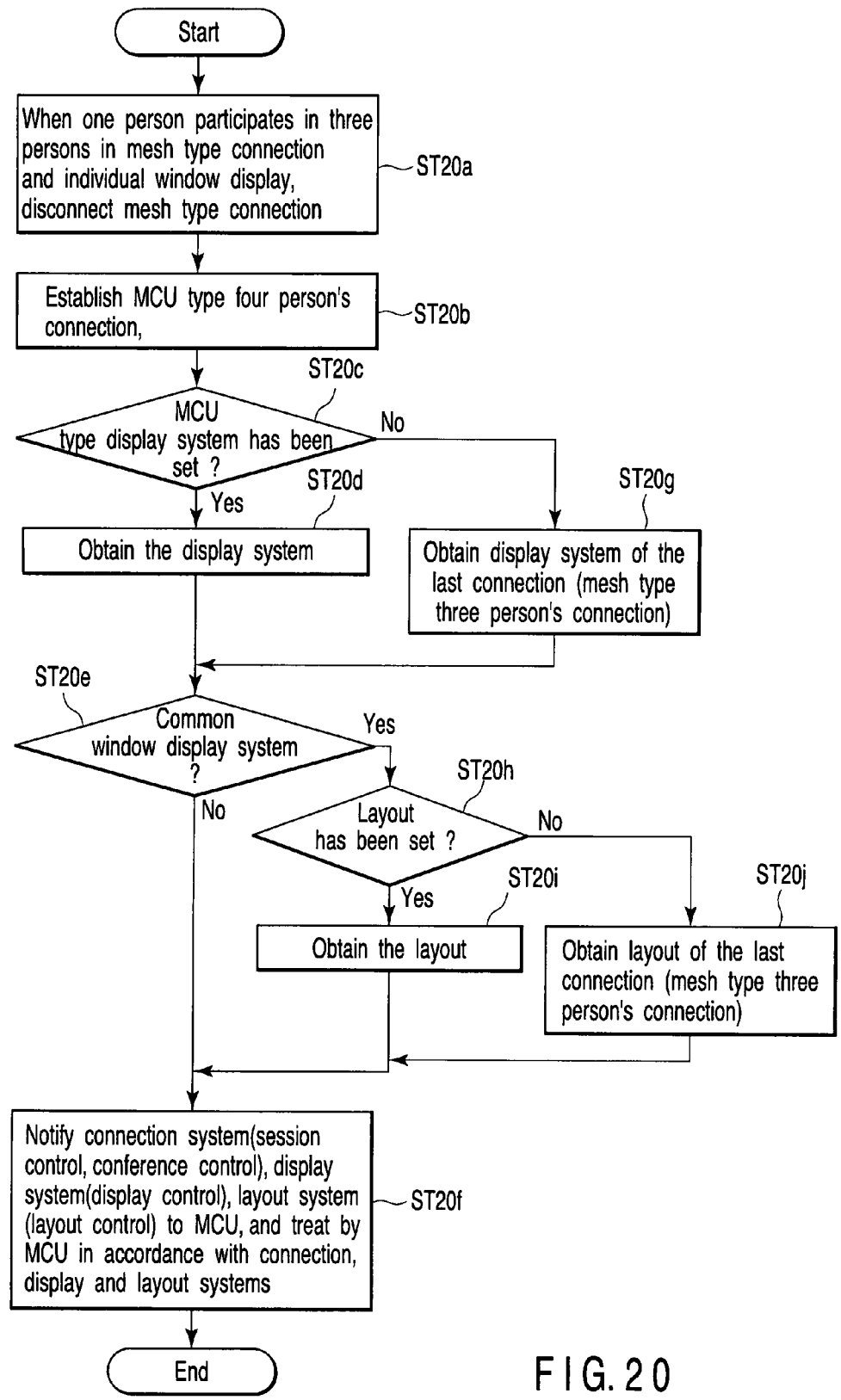
FIG. 20 is an exemplary flowchart depicting a control processing procedure of the VCS server in switching from the mesh type to the MCU type in the second embodiment.

In switching from the mesh type to the MCU type, the VCS server SVB executes the processing procedure which will be illustrated in FIG. 20.

Now, it is supposed that the mesh type session has established among the data terminals PC5-PC7. In this state, for example, if the data terminal PC8 is added to the session, the VCS server SVB transmits mesh type disconnection instructions to the data terminals PC5-PC7 (block ST20a).

The VCS server SVB then instructs session control to the MCU 2 or to the data terminals PC5-PC8 as well as to conference control, such as specification of the number of the synthesized speakers and the synthesis format, to establish the session among the MCU 2 and the data terminals PC5-PC8 (block ST20b).

After this, the VCS server SVB determines whether or not the display systems in switching to the MCU type have been set in the table 135 for each data terminal PC5-PC8 (block ST20c).

In this case, in the data terminal PC5, the "individual window" having been set, the VCS server SVB obtains the "individual window" from the table 135 (block ST20d), shifts from a block 20e to a block ST20f, and there, notifies the message indicating the maintenance of the "individual window" to the MCU2.

Thus, the individual window display system displays the screens concerned with each data terminal PC6, PC7 and PC8 onto the display unit 23 of the data terminal PC5.

On the other hand, in the data terminal PC6, any display system not having been set to the table 135, the VCS server SVB obtains the just previous display system "individual window" from the table 135 (block ST20g) to shifts to the processing in the block ST20e.

In the block ST20e, in the case of the "common window", the VCS server SVB determines whether any layout has been set or not (block 20h). If any layout has been set, the VCS server SVB obtains the layout (block ST20i) to shift to the block ST20f.

Meanwhile, in the block ST20h, if the layout for the MCU processing is not set in the table 135, the VCS server SVB obtains the just previous layout from the table 135 (block ST20j) to make a shift to the processing in the block ST20f.

As mentioned above, in the second embodiment, selectively setting in advance the layouts for the switching from the mesh type to the MCU type, or from the MCU type to the mesh type in the table 135 of the VCS server SVB avoids changing the layout patterns to be displayed on the display units 23 of each data terminal PC1-PCn even if display systems have been switched from the mesh type to the MCU type, or from the MCU type to the mesh type, and avoids making the users of the data terminals PC1-PCn to feel something is wrong in view of this.

Even in a case that the users of the data terminals PC1-PCn have not set any layout into the table 135 of the VCS server SVB, even when the display system has been switched for the mesh type to the MCU type, or from the MCU type to the mesh type, the VCS can maintain the layout pattern before switching.

Other Embodiment

The present invention is not limited to each of the foregoing embodiments. For example, having described out the invention in the first and the second embodiments as related to examples which set the display systems and the layouts for each user of the data terminals, it is our intention that the invention is not limited by these examples, the VCS may set the display system and the layout totally by the whole system. This total setting is effective, for instance, to hold a conference in an enterprise. A various kinds of conditions may be usable for the VCS.

In each given embodiment, while the VCS server has instructed to the MCU on the assumption that the VCS server and the MCU differ from each other, the invention aims at the case in which the server function and the MCU function are executed in one entity.

In the second embodiment, the layout not only with the longitudinal arrangement and the lateral arrangement but also with the even layout, in which he number of displayed persons are comparatively differs in even numbers and odd numbers, for example, in the case of four persons, the even layout shows the same size displays of two in longitudinal arrangement and two in lateral arrangement, and in the case of five persons, the even layout adds one with the same size display at the bottom face of the even layout for the four persons, is also applicable.

Having described each forgoing embodiment by aiming images of moving objects (camera images), the aforementioned display systems and the layouts are applicable to other media of a visual communication, such as application sharing (sharing electronic files of conference, capable of turning over pages of electronic files among partners sharing them, and of reflecting correction in real time to partners). In FIG. 1, for example, the invention is applicable to the case, in which a user A shares a document 1 on its own data terminal with a partner, a user B shares a document 2 on its own data terminal with a partner, and a user C shares a document 3 on its own terminal with a partner, by sharing applications, respectively.

Each given embodiment having described the example to have the main apparatus and the VCS server separately, the VCS server may have the function of the main apparatus built-in.

Other than this, various modifications of the configurations and types of the VCS servers, of the types of the telephone exchanges (not limited to main apparatus but PBX is usable) and of the types of the extension terminals, of the types of the data terminals, of the storage contents of various tables, of methods of associating with the data terminals in conference call connections are may also be made without departing from the keynote of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication system, comprising:
a plurality of data terminals which each include display units;
a conference processing unit to execute conference synthesis processing among the plurality of data terminals;
a server apparatus which receives a call information event including telephone IDs specifying a plurality of telephone terminals by which a conference connection is made, links communication connections in several data terminals associated with the telephone IDs, respectively, to the conference connection, and also enables connecting a conference processing unit;
a connection controller which selectively executes first processing to execute the communication connections among the several data terminals, and second processing to make the several data terminals communication-connect to the conference processing unit;
a table which stores a data indicating the corresponding relations among user IDs specifying a plurality of data terminals, connection systems, and display systems, wherein said relations for the connection systems to indicate at least one of the first processing and the second processing, and the display systems to indicate at least one of a first screen display mode to individually display a plurality of screens related to each of the several data terminals in the first processing on the display units, and a second screen display mode to display screens in which a plurality of screens related to each of the several data terminals in the second processing are synthesized by the conference processing unit on the display units;
a processor which executes the first screen display mode and executes the second screen display mode based on the table for each of the several data terminals; and
a switching controller which selectively executes switching from the first screen display mode to the second screen display mode and maintaining a screen display mode before switching, based on the table, in switching from the first processing to the second processing, and selectively executes switching from the second screen display mode to the first screen display mode and maintaining a screen display mode before switching, based on the table, in switching from the second processing to the first processing.

2. The communication system according to claim 1, wherein the switching controller notifies instruction information of the fact to maintain the first screen display mode to the conference processing unit from the server apparatus based on the table in switching from the first processing to the second processing.

3. The communication system according to claim 1, wherein the switching controller notifies instruction information of the fact to maintain the first screen display mode to the corresponding data terminals from the server apparatus based on the table in switching from the second processing to the first processing.

4. The communication system according to claim 1, wherein the switching controller executes the second screen display mode to the corresponding data terminals in switching from the second processing to the first processing when the first screen display mode is not selectively set in the first processing by at least one of the several data terminals.

5. The communication system according to claim 1, wherein the switching controller executes the first screen display mode to the corresponding data terminals in switching from the first processing to the second processing when the second screen display mode is not selectively set in the second processing by at least one of the several data terminals.

6. The communication system according to claim 1, wherein the processor selectively executes one of a plurality of layout patterns differing in arrangement pattern of a plurality of screens on the display units from one another based on the setting of the data terminals in carrying out the second screen display mode.

7. The communication system according to claim 6, wherein the switching controller displays a plurality of screens in the same layout pattern as that of in the second processing on the display units of the corresponding data terminals in switching from the second processing to the first processing, when the second screen display mode in the first processing, and a common layout pattern in the first and the second processing are selectively set by at least one of the several data terminals.

8. The communication system according to claim 6, wherein the switching controller displays a plurality of screens in the same layout pattern as that of the second processing on the display units of the corresponding data terminals in switching from the second processing to the first processing, when the second screen display mode is selectively set, and the layout pattern is not selectively set in the first processing by at least one of the several data terminals.

9. The communication system according to claim 1, wherein the server apparatus includes the conference processing unit built-in.

10. The communication system according to claim 1, further comprising:
an interface which connects a telephone exchange apparatus to execute exchange processing among a plurality of telephone terminals, and receives a call information event to be notified from the telephone exchange apparatus.

11. A server apparatus which receives a call information event including telephone IDs specifying a plurality of telephone terminals by which a conference connection is made, links communication connections in several data terminals associated with the telephone IDs, respectively, to the conference connection, and also enables connecting a conference processing unit, comprising:
a connection controller which selectively executes first processing to execute the communication connections among the several data terminals, respectively, and second processing to make the several data terminals, respectively, to communication-connect to the conference processing unit, when the conference connection among the plurality of telephone terminals is established;
a table which stores data indicating the corresponding relations among user IDs specifying a plurality of data terminals, connection systems, and display systems, wherein said relations for the connection systems to indicate at least one of the first processing and the second processing, and the display systems to indicate at least one of a first screen display mode to individually display a plurality of screens related to each of the several data terminals in the first processing on the display units, and a second screen display mode to display screens in which a plurality of screens related to each of the several data terminals in the second processing are synthesized by the conference processing unit on the display units;
a processor which executes the first screen display mode and executes the second screen display mode, based on the table for each of the several data terminals; and a switching controller which selectively executes switching from the first screen display mode to the second screen display mode and maintaining a screen display mode before switching, based on the table, in switching from the first processing to the second processing, and selectively executes switching from the second screen display mode to the first screen display mode and maintaining a screen display mode before switching, based on the table, in switching from the second processing to the first processing.

12. A display control method to be used in a communication system which comprises a plurality of data terminals to each include display units; and a server apparatus to receive a call information event including telephone IDs specifying a plurality of telephone terminals by which a conference connection is made, to link communication connections in several data terminals associated with the telephone IDs, respectively, to the conference connection, and also to enable connecting a conference processing unit, comprising:

selectively executing first processing to execute the communication connections among the several data terminals, respectively, and second processing to make the several data terminals, respectively, communication-connect to the conference processing unit;

storing data indicating the corresponding relations among user IDs specifying a plurality of data terminals, connection systems, and display systems in a table, wherein said relations for the connection systems to indicate at least one of the first processing and the second processing, and the display systems to indicate at least one of a first screen display mode to individually display a plurality of screens related to each of the several data terminals in the first processing on the display units, and a second screen display mode to display screens in which a plurality of screens related to each of the several data terminals in the second processing are synthesized by the conference processing unit on the display units;

executing the first screen display mode in the first processing, based on the table;

executing the second screen display mode based on the table in the second processing; and selectively executing switching from the first screen display mode to the second screen display mode and maintaining a screen display mode before switching, based on the table, in switching from the first processing to the second processing, and selectively executing switching from the second screen display mode to the first screen display mode and maintaining a screen display mode before switching, based on the table, in switching from the second processing to the first processing.

13. The server apparatus according to claim 11, wherein the switching controller notifies instruction information of the fact to maintain the first screen display mode to the conference processing unit based on the table in switching from the first processing to the second processing.

14. The server apparatus according to claim 11, wherein the switching controller notifies instruction information of the fact to maintain the first screen display mode to the corresponding data terminals based on the table in switching from the second processing to the first processing.

15. The server apparatus according to claim 11, wherein the switching controller executes the second screen display mode to the corresponding data terminals in switching from the second processing to the first processing when the first screen display mode is not selectively set in the first processing by at least one of the several data terminals.

16. The server apparatus according to claim 11, wherein the switching controller executes the first screen display mode to the corresponding data terminals in switching from the first processing to the second processing when the second screen display mode is not selectively set in the second processing by at least one of the several data terminals.

17. The server apparatus according to claim 11, wherein the processor selectively executes one of a plurality of layout patterns differing in arrangement pattern of a plurality of screens on the display units from one another based on the setting of the data terminals in carrying out the second screen display mode.

18. The server apparatus according to claim 17, wherein the switching controller displays a plurality of screens in the same layout pattern as that of in the second processing on the display units of the corresponding data terminals in switching from the second processing to the first processing, when the second screen display mode in the first processing, and a common layout pattern in the first and the second processing are selectively set by at least one of the several data terminals.

19. The server apparatus according to claim 17, wherein the switching controller displays a plurality of screens in the same layout pattern as that of the second processing on the display units of the corresponding data terminals in switching from the second processing to the first processing, when the second screen display mode is selectively set, and the layout pattern is not selectively set in the first processing by at least one of the several data terminals.

20. The server apparatus according to claim 11, further comprising:

an interface which connects a telephone exchange apparatus to execute exchange processing among a plurality of telephone terminals, and receives a call information event to be notified from the telephone exchange apparatus.

21. The method according to claim 12, wherein the executing comprises notifying instruction information of the fact to maintain the first screen display mode to the conference processing unit based on the table in switching from the first processing to the second processing.

22. The method according to claim 12, wherein the executing comprises notifying instruction information of the fact to maintain the first screen display mode to the corresponding data terminals based on the table in switching from the second processing to the first processing.

23. The method according to claim 12, wherein the executing comprises executing the second screen display mode to the corresponding data terminals in switching from the second processing to the first processing when the first screen display mode is not selectively set in the first processing by at least one of the several data terminals.

24. The method according to claim 12, wherein the executing comprises executing the first screen display mode to the corresponding data terminals in switching from the first processing to the second processing when the second screen display mode is not selectively set in the second processing by at least one of the several data terminals.

25. The method according to claim 12, wherein the executing the second screen display mode comprises selectively executing one of a plurality of layout patterns differing in arrangement pattern of a plurality of screens on the display units from one another based on the setting of the data terminals in carrying out the second screen display mode.

26. The method according to claim 25, wherein the selectively executing switching comprises displaying a plurality of screens in the same layout pattern as that of in the second processing on the display units of the corresponding data terminals in switching from the second processing to the first processing, when the second screen display mode in the first processing, and a common layout pattern in the first and the second processing are selectively set by at least one of the several data terminals.

27. The method according to claim 25, wherein the selectively executing switching comprises displaying a plurality of screens in the same layout pattern as that of the second processing on the display units of the corresponding data terminals in switching from the second processing to the first processing, when the second screen display mode is selectively set, and the layout pattern is not selectively set in the first processing by at least one of the several data terminals.

28. The method according to claim 12, further comprising: connecting a telephone exchange apparatus to execute exchange processing among a plurality of telephone terminals, and receiving a call information event to be notified from the telephone exchange apparatus.

* * * * *